Oct. 21, 1958 A. W. KOGSTROM ET AL 2,857,214
BEARING CONSTRUCTION
Filed Jan. 4, 1955 2 Sheets-Sheet 1
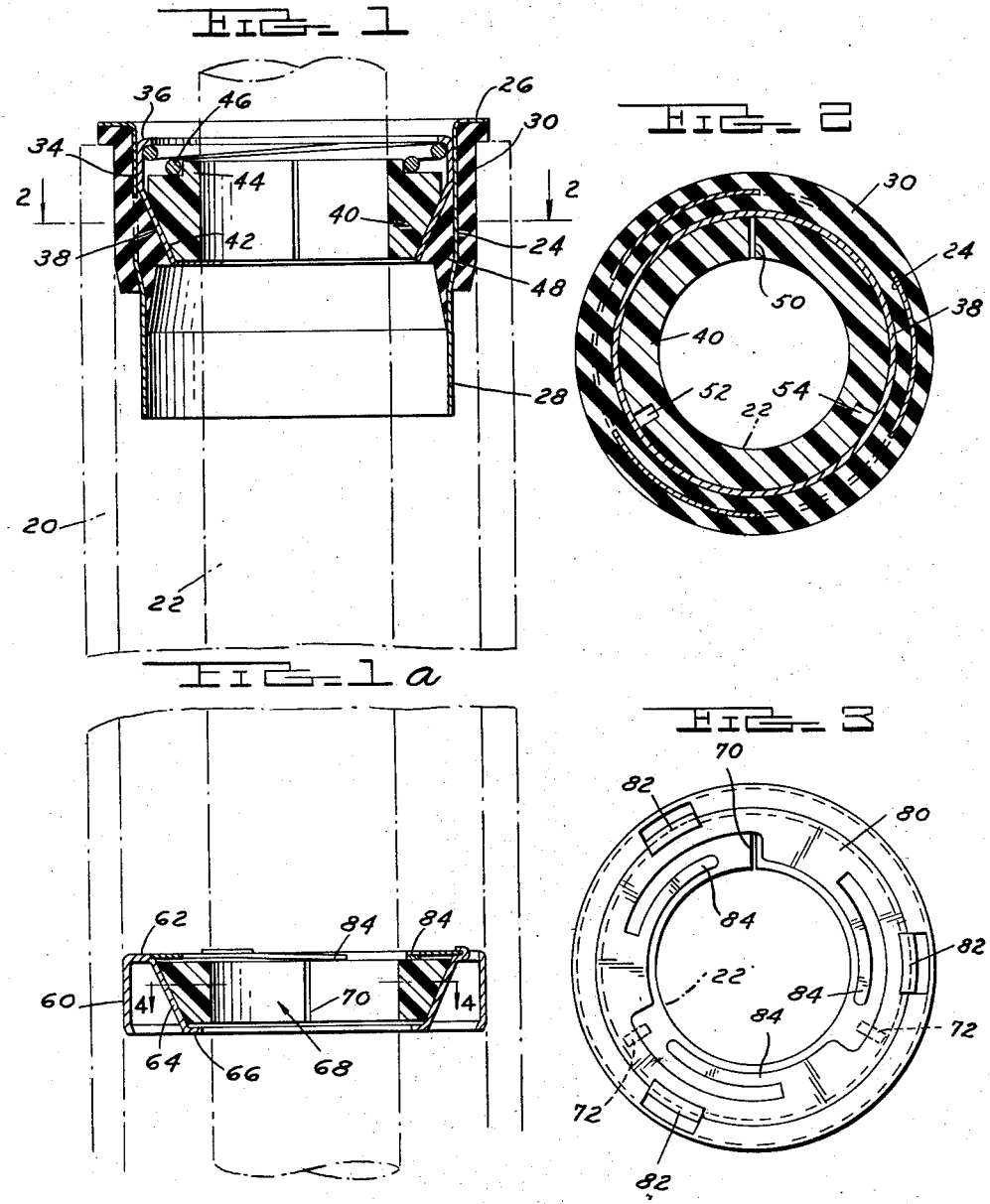
INVENTORS
AXEL W. KOGSTROM
FREDERIC R. SMITH
BY
Barney, Kinelle, Laughlin & Raisch
ATTORNEYS

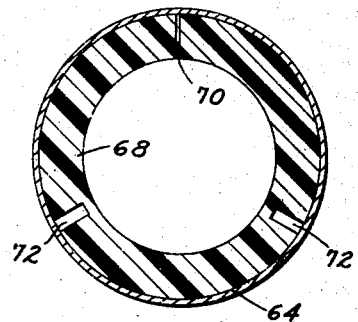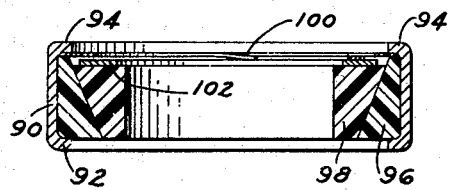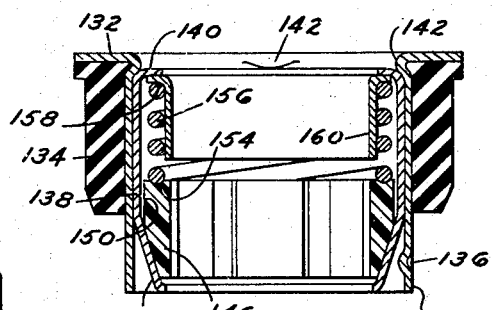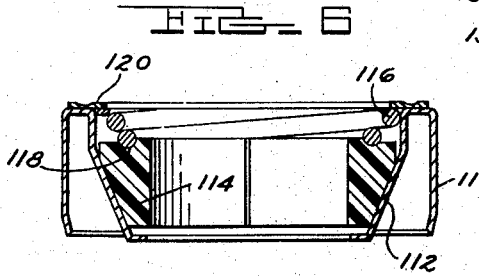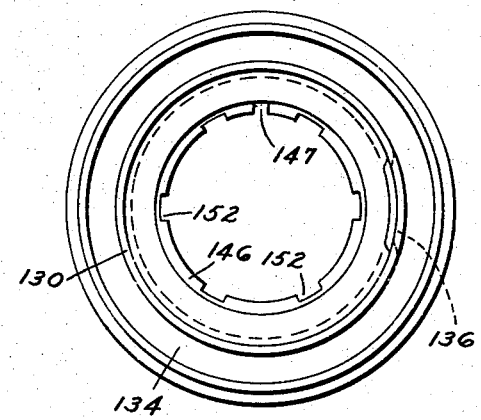
INVENTORS
AXEL W. KOGSTROM
FREDERIC R. SMITH
BY
ATTORNEYS

United States Patent Office 2,857,214
Patented Oct. 21, 1958

2,857,214

BEARING CONSTRUCTION

Axel W. Kogstrom and Frederic R. Smith, Whitmore Lake, Mich., assignors to O & S Bearing & Mfg. Co., Whitmore Lake, Mich., a corporation of Michigan Application January 4, 1955, Serial No. 479,808

8 Claims. (Cl. 308—71)

This invention relates to a bearing construction.

It is an object of the present invention to provide a shaft bearing which will support a shaft subject to rotation and axial shifting.

It is a further object to provide a bearing which may adapt itself to variations in shaft dimension without affecting the operation thereof, and these variations may result from either workmanship of the parts or may result from heat expansion and contraction. The bearing can be an insulating bearing, that is, electrical insulating. It has a low friction, is noiseless, has non-metallic contact, and is self-compensating for expansion or contraction due to temperature changes and will accommodate a wide tolerance of the shaft diameter.

Another object of the invention is to provide a bearing construction which is self-compensating for radial and lateral wear and which automatically centers and is self-lubricating.

Other objects and features of the invention relating to details of construction and operation will be apparent in the following description and claims.

Drawings accompany the disclosure, and the various views thereof may be briefly described as:

Figure 1, a combination assembly sectional view showing the manner in which the bearing of the present invention is used to mount a shaft in a cylindrical column.

Figure 1a, a modified form of bearing also installed for a shaft mounting.

Figure 2, a transverse section on line 2—2 of Figure 1.

Figure 3, an elevation of the lower bearing of Figure 1a.

Figure 4, a sectional view on line 4—4 of Figure 1a.

Figure 5, a sectional view of a modified type of bearing.

Figure 6, a sectional view of still another modification of the bearing.

Figure 7, a sectional view of a modified form of the bearing incorporating a stop ring.

Figure 8, a bottom view of the assembly shown in Figure 7.

Referring to the drawings, the device is shown illustrated in connection with a steering column bushing and assembly. The outline of the outer cylinder and the steering column, which is sometimes called the "mast jacket," is shown at 20 in Figure 1; and the steering shaft itself is shown at 22. At the top of the mast jacket is a first example of the invention consisting of a cylindrical member 24 flanged at 26 and ensmalled at 28. This member is coated with a rubber jacket 30 which insulates the member 24 from the mast jacket.

Pressed into the cylindrical bushing 24 is a secondary bushing 34 having a cylindrical form at one axial portion which is flanged inwardly at 36 at the top and shaped in the form of frusto-conical portion 38 at the lower end. This frusto-conical portion preferably has an included angle of about 35 to 40 degrees, and best results are obtained if the angle is not over 45 degrees, and not less than 30 degrees.

Positioned within the bushing 34 is a circular, hard, plastic insert 40 preferably formed of nylon or a similar material. This member 40 has a frusto-conical surface 42 to co-operate with the portion 38 of bushing 34. It also has a smaller diameter axial extension 44 which provides a shoulder for locating a coil spring 46 engaged under the flange 36 at the top and encircling the axial extension 44 on the insert 40. The space between the portion 38 of the inner bushing and a portion of the outer bushing is filled with rubber at 48.

Referring to Figure 2, it will be seen that the ring 40 is split at 50 and also is notched on the outer circumference at 52 and 54, making it possible for the ring 40 to expand and contract radially. This expansion and contraction will be accomplished by axial motion of the ring 40 on the cone surface 38, and radial expansion of ring 40 will result in a thrust against the spring 46. The spring 46 will exert a load on ring 40 which will cause ring 40 to contract radially.

A modified form of the invention is shown also in Figure 1a at the lower end of the combination wherein between the mast jacket and the shaft 22 there is interposed a small, expansible, self-compensating bearing unit having an outer cylindrical housing 60 which is formed to have an inwardly extending flange 62 integrally joined with a frusto-conical section 64 terminating in an inward flange 66.

Lying within the section 64 is a circular split plastic insert 68 with the adjoining ends at 70. This insert is split at 70 to permit contraction and expansion. The insert is notched at 72 for the purpose during expansion or contraction of maintaining the inner diameter as concentric as possible. This is aided by the flexibility of the plastic in the thin section of the notch. The insert 68, preferably formed of nylon or a similar plastic material, is retained in the housing by a circular leaf spring plate 80 retained at its borders by tabs 82 (see Figure 3) and having around its inner periphery notched portions in which extend axially offset spring leaves 84. These leaves bear against the top surface of ring 68 to urge it downwardly into the conical portion of the retainer. Thus, in this embodiment the supporting ring 68 is expansible and can adjust to radial variations and allow axial movement.

It will be noticed that shaft 22 is electrically insulated from the mast jacket by the non-conductive, plastic, bearing member so that if electrical contact is required for horn actuation the shaft can be used as a conductor.

In Figure 5 another modification is shown wherein the bearing retaining ring 90 is cylindrical with inturned flanges 92 and 94 at the bottom and top. Within the ring is retained a frusto-conical ring of nylon or similar plastic 96, and acting on this is the same split center ring 98 retained by a circular multiple leaf spring 100 acting on a middle washer 102. The spring leaf 100 is similar to that shown in Figure 3 and is retained by the upper flange 94 of the sheet metal housing 90.

In Figure 6 another modification is shown in which an outer housing 110 is turned inwardly to provide a frusto-conical housing 112 in which is received a split plastic ring 114 retained in place by a coil spring 116 which fits in an annular opening 118 in the top of the ring 114. The spring 116 fits upwardly on a ring 120 spot-welded to the housing 110.

The devices shown have the advantage that they may be forced into an outer cylinder 20, for example, which is not exactly circular or which has irregular portions in it due to the process of manufacture. For example, if the outer tube 20 is a seam tube, it may have a weld scar on the inside. With previous bearings it has been necessary to machine the inside of the tube to prevent distortion of the bearing. With the present type of bearing construction utilizing the same clearance between the parts the bearing housing may be forced into the outer jacket, and it is sufficiently resilient and malleable to absorb any irregularities in the outer housing without disturbing the centering of the bearing or the roundness. It will also absorb variation in dimensions which may occur as a result of manufacturing tolerances. Similarly, the bearing construction is such that it will absorb manufacturing tolerances with respect to the inner members and it will also permit axial movement, which is sometimes necessary for power steering now developing in automotive vehicles.

Furthermore, with the present bearing construction it is a simple matter to adjust the outer flange, for example, in the bearing 60 to any outer dimension required without changing the inner components of the bearing.

In Figures 7 and 8 another embodiment is shown designed for an assembly similar to that shown in Figure 1. A main brass housing consists of a tubular portion 130 having a top flange 132 for use as a horn ring contact. Insulating rubber 134 jackets the device. A small arcuate groove 136 serves as a recess for a connecting wire for the horn circuit. Within the brass housing 130 is a bearing assembly confined in a steel jacket sleeve 138 having a cylindrical portion inwardly flanged at 140 and pressed into the brass sleeve 130 upwardly against four indentation stops 142. At the bottom of sleeve 138 is formed the frusto-conical bearing receiving portion 144 in which lies a bearing ring 146 formed of bearing nylon, Teflon, or a similar bearing plastic of the molded or thermosetting type. This ring 146, split at 147, has also a frusto-conical portion and a cylindrical portion, the latter portion having a diameter slightly smaller than the internal diameter of the cylindrical part of jacket 138 to provide expansion clearance at 150. The ring 146 is axially grooved internally at 152 to allow lubricant to pass into and through the bearing. The upper edge of the bearing is grooved at 154 to receive the lower coil of a spring 156 which is seated at the top against an external flange 158 on a limit sleeve 160 extending downwardly toward but spaced from the top edge of bearing insert 146.

In this embodiment, any undue radial force applied to the bearing unit, which will cause ring 146 to raise upward, will be limited by contact of the upper edge of bearing ring 146 with the lower edge of sleeve 160. The space between sleeve 160 and sleeve 138 can be packed with a suitable lubricant when initially installed and the bearing is good for the life-time of a vehicle without need for additional lubrication.

It will thus be seen that there is disclosed a bearing which will compensate for out-of-round conditions, variations in shaft diameter, eccentricity, or even shaft expansion, without an appreciable change in torque.

We claim:

1. A bearing insert assembly for bodily insertion into a cylindrical sleeve for supporting radial loads and adapted to permit axial motion, which assembly comprises a housing formed of sheet material and having a frusto-conical recess with an included angle of 35 to 40°, the inner surface of said housing being relatively smooth, a bearing member within said housing having a frusto-conical outer surface complemental to that of the housing, said bearing member being split to permit circumferential expansion, and resilient means confined within said housing to exert axial force on said member in the direction of the apex of the conical configuration.

2. A bearing combination as defined in claim 1 in which the housing is formed of sheet metal and formed outwardly of said inner surface to provide a mounting means of greater diameter than the inner surface.

3. A bearing combination as defined in claim 1 in which the housing is formed with spaced portions, inwardly as a frusto-conical shell, and outwardly as a cylindrical shell.

4. A bearing combination as defined in claim 1 in which the resilient means comprises a ring of resilient material having circumferentially extending, axially displaced fingers biasing the bearing member.

5. A bearing assembly for supporting concentric, radially spaced inner and outer members for relative rotation and axial motion which comprises, a sheet-metal shell having a substantially cylindrical portion to lie within and in contact with the outer member, an inwardly extending flange portion at one end of said cylindrical portion, and a frusto-conical seat formed on an axis co-incident with said cylindrical portion, a split bearing insert within said seat having an outer wall complemental thereto and an inner cylindrical surface to receive said other spaced member, and spring means anchored on said inwardly extending flange portion exerting axial pressure on said bearing insert in the direction of the apex of the conical configuration.

6. A bearing assembly for supporting concentric, spaced members of cylindrical form which comprises, a bearing housing having an inturned flange at one end and frusto-conical seat formed at the other end, a split bearing member complementally fitted in said seat and having a substantially cylindrical central opening for receiving the inner of said spaced members, a coil spring seated at one end on said split bearing member, a spring guide and bearing stop comprising a sleeve interposed between said split bearing member and inturned flange, said sleeve having an out-turned flange to underlie said inturned flange and serving as a seat and retainer for the other end of said coil spring, the unflanged end of said sleeve being co-axial with said split bearing member to limit the axial movement of said last member.

7. A bearing assembly for supporting concentric spaced members of cylindrical form which comprises, a bearing housing having an inturned flange at one end and a frusto-conical seat formed at the other end, a split bearing member complementally fitted in said seat and having a substantially cylindrical central opening for receiving the inner of said spaced members, a spring guide and bearing stop comprising a sleeve interposed between said split bearing member and inturned flange, said sleeve having an out-turned flange to underlie said inturned flange, resilient means interposed between said inturned flange and said split bearing member, the unflanged end of said sleeve being coaxial with said split bearing member to limit the axial movement of said last member.

8. A bearing unit assembly for cartridge assembly comprising a housing having an inner substantially cylindrical wall, a conical seat at one end of said cylindrical wall, and an outer substantially cylindrical wall and coaxial with said inner cylindrical wall and spaced therefrom, a split bearing member complementally fitting said seat and extending for a portion of the axial length of said housing, means extending radially inward adjacent the top of said housing, a resilient means completely confined within said housing interposed between said last means and said split bearing member to urge said bearing member into said conical seat, and means at one end of said housing for limiting the axial motion of said split bearing member relative to said housing.

References Cited in the file of this patent

UNITED STATES PATENTS

| | | |
|---|---|---|
| 1,149,299 | Shearer | Aug. 10, 1915 |
| 1,998,728 | Marles | Apr. 23, 1935 |
| 2,662,419 | Lincoln et al. | Dec. 15, 1953 |
| 2,675,283 | Thomson | Apr. 13, 1954 |

FOREIGN PATENTS

| | | |
|---|---|---|
| 374,593 | France | Apr. 22, 1907 |
| 745,554 | France | Feb. 21, 1933 |